Figure 1:
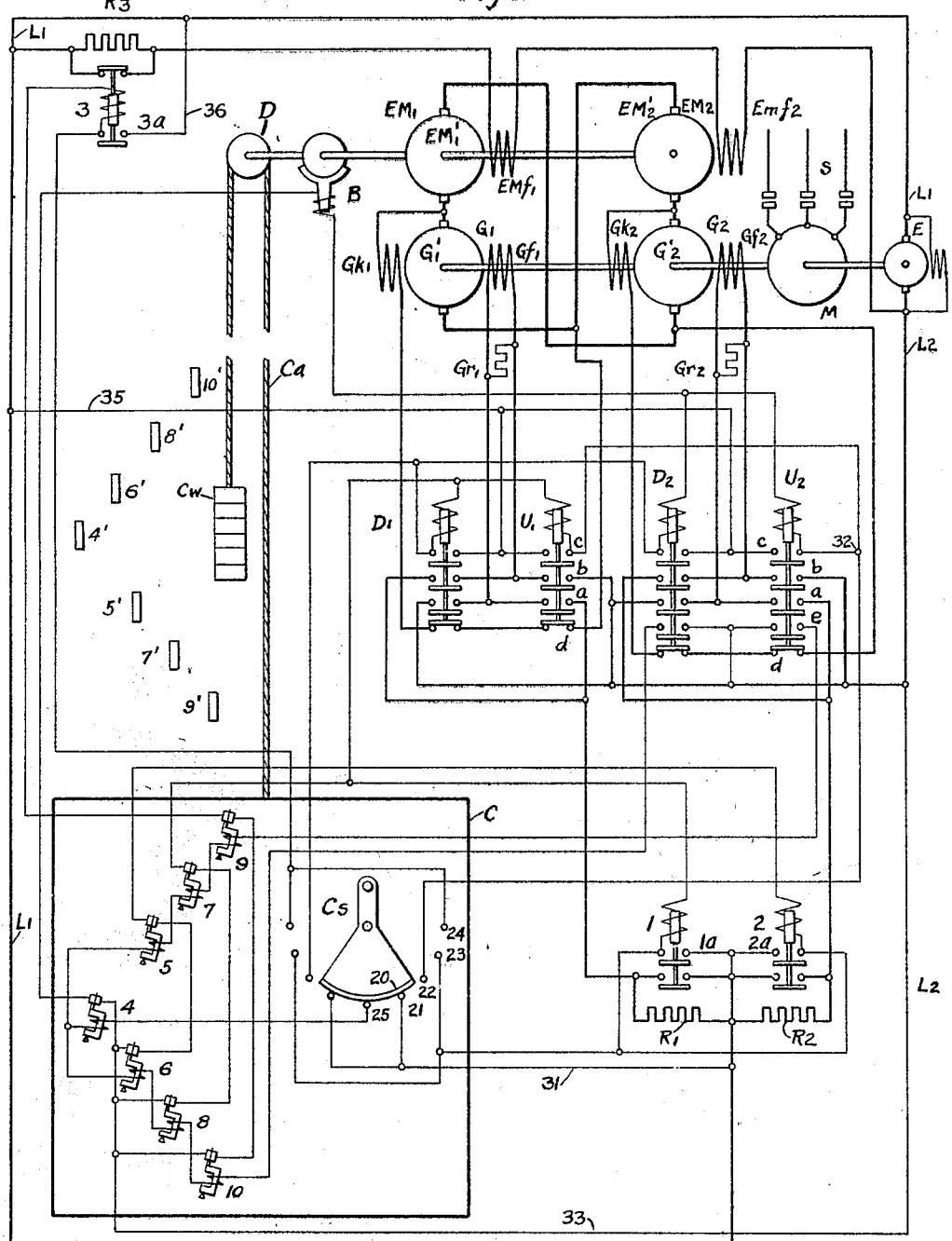

Patented Aug. 16, 1932

1,871,698

UNITED STATES PATENT OFFICE

HENRY D. JAMES, OF EDGEWOOD, AND HAROLD W. WILLIAMS, OF WILKINSBURG, PENNSYLVANIA, ASSIGNORS TO WESTINGHOUSE ELECTRIC AND MANUFACTURING COMPANY, A CORPORATION OF PENNSYLVANIA

MOTOR CONTROL SYSTEM

Application filed December 17, 1929. Serial No. 414,684.

Our invention relates to motor-control systems and particularly to control systems for elevators, hoists and similar machinery in which great accuracy is required in controlling the speed of the motor in the low-speed range.

More particularly, our invention relates to a variable-voltage control system, one feature of novelty being that the speed of the motor is controlled by varying the voltage supplied to it by a plurality of generators connected in series relation, and that a low speed is obtained by removing the excitation of all but one of the generators.

In heavy-duty high-speed elevator systems employing the variable-voltage drive, difficulty is experienced in operating the cars at landing speed because of limitations in the design of generators and motors. That is to say, at low motor speeds, the generator voltage is so low that the resistance drops in the armatures of the generators and motors and in the conductors connecting them may be a considerable part of the generator voltage; and also the generator field flux may be so low that the residual flux may be a considerable part of the total field flux.

An object of our invention is to minimize the effects of regulation and residual magnetism by providing a plurality of generators so operated that all are effective in series relation to each other to supply high voltage to the motor for operation at high speed, whereas only one of the generators is effective at reduced voltage to supply low voltage for operation at landing speeds.

In this way, the low voltage obtained for landing speeds is a higher percentage of the full voltage of a generator than would be the case if only a single generator were employed to supply the entire energy for both low-speed and high-speed operations. In the practice of our invention, we are able to obtain a lower landing speed than would be practicable if a single large generator were used and also to obtain better speed regulation at the landing speed. At the same time, we avoid the difficulties which would be met in a single large generator because of excessive time lag in building up the generator field.

A further object of our invention is to provide a variable-voltage system having a plurality of generators in which acceleration of the motor is effected by:
1. Exciting the generators and increasing their excitation in one or more steps.
2. Reducing the excitation of the motor in one or more steps.

And in which retardation of the motor is effected by:
1. Increasing the excitation of the motor in one or more steps.
2. Removing the excitation of part of the generators.
3. Reducing the excitation of the remaining generator in one or more steps.
4. Removing the excitation of the remaining generator and applying the brake.

Other and more specific objects of our invention will appear from the following description and appended claims.

Figure 2:
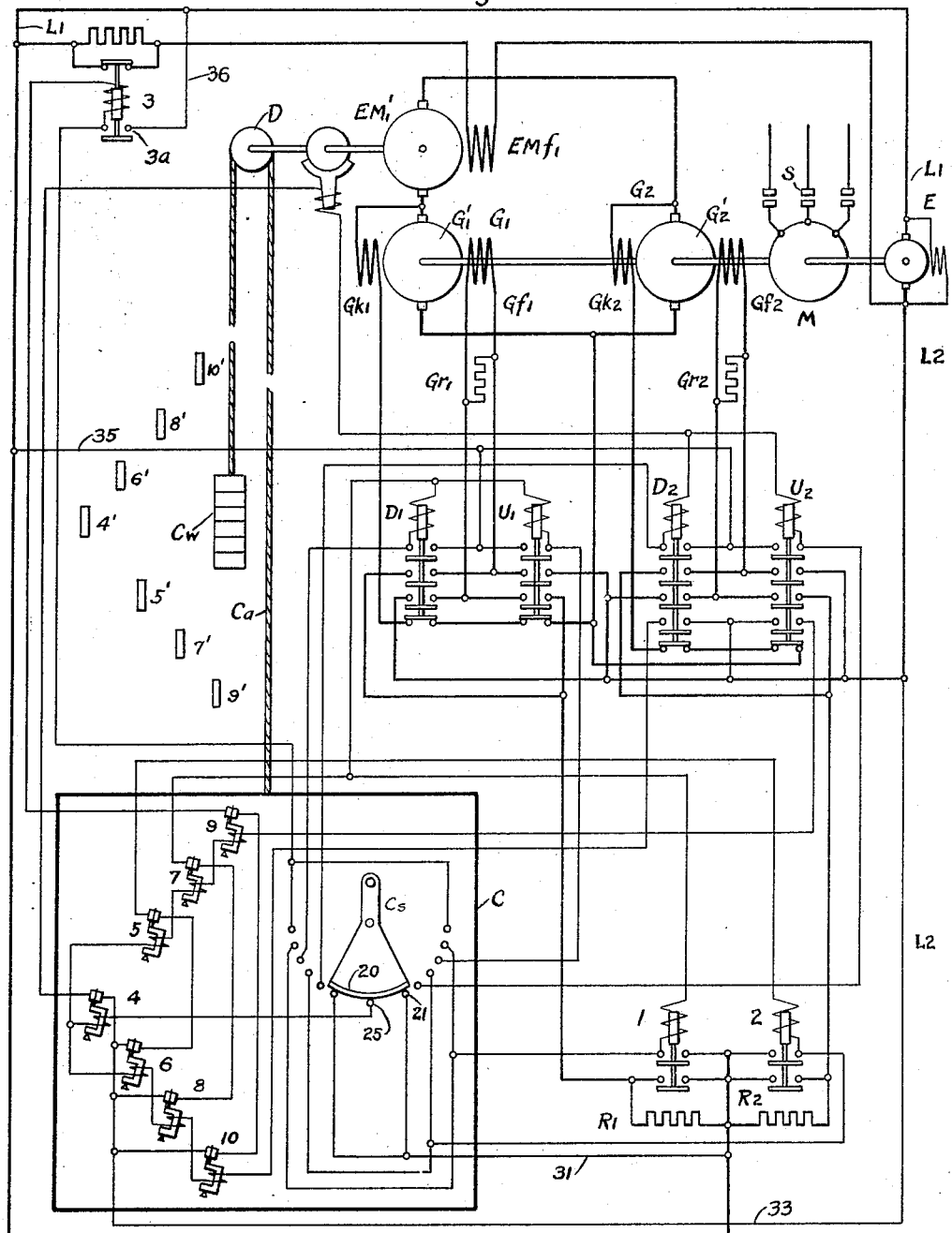

The invention may best be understood by reference to the accompanying drawings in which, Figure 1 is a schematic diagram of our invention applied to an elevator system and Fig. 2 is a schematic diagram of a modification of the system shown in Fig. 1.

Referring to Fig. 1 of the drawings, an elevator car C is shown suspended, in the usual manner, from a cable $Ca$ which passes over a hoisting drum D to a suitable counterweight $Cw$. Directly coupled to the hoisting drum D are two armatures $EM_1'$ and $EM_2'$ of two elevator motors $EM_1$ and $EM_2$, respectively, such motors being respectively provided with separately excited field windings $EMF_1$ and $EMF_2$. The motor armatures $EM_1'$ and $EM_2'$ are connected alternately in a "loop" circuit with the armatures $G_1'$ and $G_2'$ of two generators $G_1$ and $G_2$, the connections being such that the voltage between any two points in the loop circuit does not exceed the voltage of a single machine. This system of connections being well known, we make no claim for the novelty thereof.

The generators $G_1$ and $G_2$ have separately excited field windings $Gf_1$ and $Gf_2$, respectively. Field-discharge resistors $Gr_1$ and $Gr_2$ are permanently connected across the field windings $Gf_1$ and $Gf_2$, respectively, in the usual manner. The generator $G_1$ is also provided with an extra field winding $Gk_1$ which is connected across the generator armature when both direction switches $U_1$ and $D_1$ are open, the direction of the flux set up in field winding $Gk_1$ being such that it opposes the main generator flux to cause rapid reduction of the generator voltage to zero, in a well known manner. The generator $G_2$ is provided with a similar extra field winding $Gk_2$, controlled by direction switches $U_2$ and $D_2$.

The generators $G_1$ and $G_2$ are driven by any suitable means, here illustrated as a motor M, controlled by a switch S. Mounted on the same shaft as the generator armatures $G_1'$ and $G_2'$ is the armature of an exciter E for supplying the direct current used in the control system.

The direction of operation of the elevator motors $EM_1$ and $EM_2$ is controlled by means of up-direction switches $U_1$ and $U_2$ and down-direction switches $D_1$ and $D_2$, which switches control the direction of current flow through the generator field windings.

The speed of operation of the elevator motors is controlled by speed relays 1 and 2 operating upon generator field resistors $R_1$ and $R_2$ and by speed relay 3 operating upon motor-field resistor $R_3$.

Referring to Fig. 2 of the drawings, an elevator car C is shown suspended, in the usual manner, from a cable Ca which passes over a hoisting drum D to a suitable counterweight Cw. Directly coupled to the hoisting drum D is an elevator motor armature $EM_1'$ provided with a separately excited field winding $EMF_1$. The motor armature $EM_1'$ is connected in a loop circuit with the armatures $G_1'$ and $G_2'$ of two generators $G_1$ and $G_2$.

The generators $G_1$ and $G_2$ are driven by any suitable means, such as motor M, controlled by switch S, as in Fig. 1. Mounted on the same shaft as the generator armatures is the armature of an exciter E for supplying the direct-current used in the control system.

The generators $G_1$ and $G_2$ are of the separately excited type, as in Fig. 1, each generator being provided with a separately excited field winding $Gf_1$ and $Gf_2$.

Field-discharge resistors $Gr_1$ and $Gr_2$ are provided, as in Fig. 1.

The direction of operation of the elevator motor $EM_1$ is controlled by means of up-direction switches $U_1$ and $U_2$ and down-direction switches $D_1$ and $D_2$ which control the direction of current flow through the generator field windings, as in Fig. 1.

Speed relays 1 and 2, operating upon generator-field resistors $R_1$ and $R_2$, and speed relay 3, operating upon motor-field resistor $R_3$, are provided, as in Fig. 1.

The control systems shown in both Figs. 1 and 2 are of the automatic-landing type wherein the accurate stopping of the elevator car C level with any of the floors served by the car is effected by the operation of suitable inductor relays carried by the car which cooperate with inductor plates mounted in the hatchway adjacent to each of the floors. A control system of this type is illustrated in the copending application of E. M. Bouton, Serial No. 731,291 filed Aug. 14, 1924 and assigned to the Westinghouse Electric & Manufacturing Company.

The inductor relays illustrated in Figs. 1 and 2 of the drawings comprise a landing relay 4, low-speed relays 5 and 6, intermediate-speed relays 7 and 8 and high-speed relays 9 and 10; relays 9, 7, 5, and 4 being operated in sequence by the inductor plates in the hatchway to effect a landing when the car is travelling upward, and relays 10, 8, 6 and 4 being operated in sequence to effect a landing when the car is travelling downward.

In either of the modifications shown, the operation of the car is initiated by the car switch Cs and continued until the car switch is centered, whereupon the inductor relays effect an automatic landing at the next adjacent floor.

A set of inductor plates is illustrated at 4', 5', 6', 7', 8', 9', and 10', in each figure. While we have shown only one set in each figure, it will be understood that a similar set is mounted in the hatchway at each floor intermediate the top and bottom floors. At the top floor, a set, corresponding to inductor plates 4', 5', 7' and 9', is provided and, at the bottom floor, a similar set, corresponding to inductor plates 4', 6', 8' and 10', is provided.

While, for simplicity, we have shown only a single step of resistance and a single speed relay for each of the field circuits in Figs. 1 and 2, it will be understood that, in practice, any of the usual accelerating means having any number of steps may be employed in any of the field circuits. It will also be understood that, while we have shown our invention applied to a system consisting of two generators and two motors in Fig. 1, and to a system consisting of two generators and a single motor in Fig. 2, our invention is not limited to such systems but may be applied to a system having any number of motors and any number of generators greater than one.

The operation of the system shown in Fig. 1 may best be described with reference to an assumed elevator operation. Assuming that the car is standing at the bottom floor and it is desired to start the car upward, the attendant on the car C moves the car-switch handle Cs to the left to supply current to the up-direction switches $U_1$ and $U_2$ through the engagement of contact members 20, 21 and 22 of the car switch Cs. This completes a circuit from supply conductor $L_1$ through conductors 30 and 31; through contact members 20, 21 and 22 of the car switch Cs and thence to division point 32. From this point, the circuit proceeds along two paths to supply conductor $L_2$, as follows: The first path extends from point 32, through the operating coil of up-direction switch $U_1$, through contact members of inductor relay 7; contact members of inductor relay 8 and return conductor 33, to supply line $L_2$. The second path extends from point 32, through the operating coil of up-direction switch $U_2$; release coil of the electromagnetic brake B and thence through contact members of inductor relay 4, to return conductor 33 and supply line $L_2$.

Upon completion of this circuit, the up-direction switches $U_1$ and $U_2$ close, completing the circuits of generator field windings $Gf_1$ and $Gf_2$. The circuit of generator field winding $Gf_1$ extends from supply line $L_1$, through resistor $R_1$, contact members $a$ of up-direction switch $U_1$, generator field winding $Gf_1$ and thence through contact members $b$ of up-direction switch $U_1$, to supply line $L_2$. The circuit of generator field winding $Gf_2$ extends from line $L_1$, through resistor $R_2$, contact members $a$ of up-direction switch $U_2$, generator field winding $Gf_2$ and contact members $b$ of up-direction switch $U_2$ and thence to supply line $L_2$.

Up-direction switch $U_1$, in closing, establishes a holding circuit for itself as follows: from supply line $L_1$, through conductor 35 contact members $c$ of up-direction switch $U_1$ through its operating coil and, from this point, to supply line $L_2$, as already traced. Closure of up-direction switch $U_1$ also breaks the circuit of extra field winding $Gh$ because of the separation of contact members $d$.

Up-direction switch $U_2$, in closing, also establishes a holding circuit for itself as follows: from supply line $L_1$, through conductor 35 contact members $c$ of up-direction switch $U_2$; through its operating coil and, from this point, to supply line $L_2$, as already traced.

The car now proceeds upward at moderate speed, its speed being limited by resistors $R_1$ and $R_2$ in the field-winding circuits of generators $G_1$ and $G_2$.

If the car switch is moved to the next position, the speed relays 1 and 2 are operated to short circuit resistors $R$ and $R_2$, thereby further increasing the car speed. The circuit of speed relay 1 is completed as follows: from supply line $L_1$, through conductors 30 and 31; contact members 21, 20 and 23 of the car switch Cs; the operating coil of speed switch 1; contact members of inductor relays 7 and 8 and thence, through return conductor 33, to supply line $L_2$. The circuit of speed relay 2 is completed as follows: from supply $L_1$, through conductors 30 and 31, contact members 21, 20 and 23 of the car switch Cs; the operating coil of speed relay 2 contact members of inductor relays 5 and 6 and thence, through return conductor 33, to supply line $L_2$.

Speed relays 1 and 2, in closing, also establish holding circuits for themselves as follows: The holding circuit of speed relay 1 extends from supply line $L_1$, through conductor 30, contact members $1a$, of the speed relay 1; thence through its operating coil and, from this point, to supply line $L_2$, as already traced. Speed relay 2 establishes a similar holding circuit for itself through its contact members $2a$.

The elevator car now moves upward at about 2/3 full speed, which might be, for example, 600 feet per minute, assuming that full speed is 900 feet per minute.

If the car switch is now moved to its last upward position, the speed relay 3 is operated to insert resistor R in series with motor-field windings $EMF_1$ and $EMF_2$, thereby weakening the motor fields and increasing the speed of the car to its maximum value of 900 feet per minute.

The circuit of speed relay 3 is completed as follows: from supply line $L_1$, through conductors 30 and 31; contact members 21, 20 and 24 of the car switch; the operating coil of speed relay 3; contact members of inductor relays 9 and 10 and thence, through return conductor 33, to supply line $L_2$.

Speed relay 3, in closing, establishes a holding circuit for itself as follows: from supply line $L_1$, through conductor 36 contact members $3a$; through the operating coil of relay 3, through contact members of inductor relays 9 and 10 and thence, through return conductor 33, to supply line $L_2$.

The car is now moving upward at maximum speed of 900 feet per minute. Assuming that it is desired to stop at the third floor, the operator centers the car switch Cs as the car passes some point slightly in advance of the set of inductor plates for the third floor.

The centering of the car switch has no immediate effect on the up-direction switches $U_1$ and $U_2$ or on the speed relays 1, 2 and 3, as each of these switches is held in by its own holding circuit. However, upon centering the car switch, a circuit is established for the magnets of the inductor relays 4, 5, 7 and 9. This circuit extends from supply line $L_1$, through conductors 30 and 31; contact members 21, 20 and 25 of the car switch Cs, through the magnet coils of inductor relays 4, 5, 7 and 9; through contact members $e$ of up-direction switch $U_2$ and thence to supply line $L_2$. It will be noted that the contact members $e$ of up-direction switch $U_2$ are closed at this time, as the switch is held in by its holding circuit.

The inductor relays 4, 5, 7 and 9 do not immediately open their contact members as their magnetic circuits are still incomplete. The car, therefore, continues to move upward at full speed until the inductor relay 9 arrives at a point in the hatchway opposite the inductor plate 9'. When this occurs, the magnetic circuit of inductor relay 9 is completed, the relay opens its contact members opening the circuit of speed relay 3, which, in turn, short circuits resistor $R_3$, thereby strengthening the separately excited field magnets $EMF_1$ and $EMF_2$ of the motors $EM_1$ and $EM_2$, decreasing the speed of the car to a value approaching ⅔ full speed or 600 feet per minute.

As the car continues upwardly at approximately ⅔ full speed, the inductor relay 7 arrives at a point adjacent to inductor plate 7' and opens its contact members. When the contact members of inductor relay 7 open, the circuits of speed relay 1 and of up-direction switch $U_1$ are broken. The opening of direction switch $U_1$ disconnects the generator field $Gf_1$ from its source and permits the field to discharge through its discharge resistor $Gr$. At the same time, the closure of contact members $d$ of up-direction switch $U_1$ connects the extra field winding $Gk_1$ across the generator armature, thereby rapidly reducing the voltage of generator $G_1$ to zero. The voltage supplied to the motors being now halved, the speed of the car is reduced to a value approaching ⅓ full speed or 300 feet per minute.

As the car continues upward at approximately ⅓ full speed, the inductor relay 5 arrives at a point adjacent to inductor plate 5' and opens its contact members. This breaks the circuit of speed relay 2 which drops out, inserting the resistor $R_2$ in series with the generator field winding $Gf_2$, thereby further reducing the voltage supplied to the motors. The car now moves at a slow landing speed, which may be of the order of 30 feet per minute, until the inductor relay 4 arrives at a point opposite the inductor plate 4'. When this occurs, the inductor relay 4 opens its contact members, breaking the circuit of up-direction switch $U_2$ and the release coil of the electromagnetic brake B. The generator field winding $Gf_2$ is, accordingly, disconnected from its source, the circuit of the extra field winding $Gk_2$ is completed through contact members $d$ of up-direction switch $U_2$, the brake is applied and the car is brought to rest. The car is now at rest at the third floor, and the direction switches $U_1$, $U_2$, $D_1$ and $D_2$ and the speed relays 1, 2 and 3 are all open ready for control by the car switch $Cs$ to initiate further operation of the car in either direction.

The operation of the elevator for downward travel is similar to that described for upward travel and will readily be understood from the above without further description.

The operation of the system shown in Fig. 2 differs from that of the system shown in Fig. 1 in that each of direction switches $U_1$, $U_2$, $D_1$ and $D_2$ and speed relays 1, 2 and 3 is controlled by a separate point on the car switch $Cs$; the closing sequence being $U_2$, 2, $U_1$ and 3 for upward travel and $D_2$, 2, $D_1$, 1 and 3 for downward travel. Each switch, in closing, establishes its own holding circuit, as in Fig. 1 and, upon the centering of the car switch, the circuits are broken by the inductor relays at the next adjacent landing, in the same manner and order as in Fig. 1.

It will be seen that we have provided a motor-generator drive of the variable-voltage type especially adapted for elevator service, in which the motive equipment is fed from a plurality of variable-voltage generators, acceleration of the motive equipment being effected by exciting the generators and subsequently increasing their excitation, either simultaneously or one after the other and subsequently weakening the excitation of the motive equipment; and deceleration being effected by strengthening the field of the motive equipment, subsequently rendering all the generators but one ineffective to supply voltage, subsequently weakening the field of the remaining generator and finally reducing the field to zero and applying the brake.

The embodiment of our invention herein described being merely illustrative, we do not desire to be limited to the details of the apparatus shown except as set forth in the appended claims.

We claim as our invention:

1. In a control system, a driven member, a motor for driving said member, a plurality of generators electrically connected to said motor, means for exciting all of said generators, and means for establishing low-speed operation of said motor comprising means operated when said driven member passes a predetermined point in its path of travel for removing the excitation of one of said generators.

2. In an elevator-control system, an elevator car, an elevator motor for moving said car, a plurality of generators electrically connected to said motor, means for exciting all of said generators, and means for establishing low-speed operation of said car comprising means operated when the car passes a predetermined point in its path of travel for removing the excitation of one of said generators.

3. In an elevator-control system, an elevator car, an elevator motor for moving said car, a plurality of generators electrically connected to said motor, means for exciting all of said generators, an extra field winding for one of said generators, and means for establishing low-speed operation of said car comprising means operated when the car passes a predetermined point in its path of travel for removing the excitation of said one of said generators, said last mentioned means comprising means for connecting said extra field winding across the armature of said one of said generators.

4. In an elevator-control system, an elevator car, an elevator motor for moving said car, a plurality of generators electrically connected to said motor, means for accelerating said car comprising means for exciting said generators, means for further accelerating said car comprising means for increasing the excitation of said generators, and means for establishing low-speed operation of said car comprising means operated when the car passes a predetermined point in its path of travel for removing the excitation of one of said generators.

5. In an elevator-control system, an elevator car, an elevator motor for moving said car, means for exciting said motor, a plurality of generators electrically connected to said motor, means for accelerating said car comprising means for exciting said generators, means for further accelerating said car comprising means for decreasing the excitation of said motor, and means for establishing low-speed operation of said car comprising means operated when the car passes a predetermined point in its path of travel for removing the excitation of one of said generators.

6. In an elevator-control system, an elevator car operable in a hatchway past a landing, an elevator motor for driving said car, a plurality of generators electrically connected to said motor, means for exciting all of said generators to cause said motor to operate at high speed, and means responsive to the position of said car for automatically decelerating said car as said car approaches said landing, including means for removing the excitation of one of said generators.

7. In an elevator-control system, an elevator car operable in a hatchway past a landing, an elevator motor for driving said car, a plurality of generators, conductors connecting the armatures of said motor and said generator in a series circuit, means for exciting all of said generators to cause said motor to operate at high speed, and means responsive to the position of said car for automatically decelerating said car as said car approaches said landing, including means for removing the excitation of one of said generators.

8. In an elevator-control system, an elevator car operable in a hatchway past a landing, an elevator motor for driving said car, a plurality of generators connected to said motor, a brake for said motor, means for exciting all of said generators to cause said motor to operate at high speed, means responsive to the position of said car for automatically decelerating said car as said car approaches said landing comprising means for rendering one of said generators ineffective and means for stopping said car comprising means for rendering the remainder of said generators ineffective and means for applying said brake.

In testimony whereof, we have hereunto subscribed our names this 12th day of December, 1929.

HENRY D. JAMES.
HAROLD W. WILLIAMS.